(12) United States Patent
Sharma

(10) Patent No.: US 7,786,878 B2
(45) Date of Patent: Aug. 31, 2010

(54) ADVANCED TRANSMITTER ISOLATION FEATURE

(75) Inventor: Thirumala G B Sharma, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 552 days.

(21) Appl. No.: 11/657,241

(22) Filed: Jan. 24, 2007

(65) Prior Publication Data

US 2008/0177484 A1 Jul. 24, 2008

(51) Int. Cl.
G08B 21/00 (2006.01)
(52) U.S. Cl. .............. 340/626; 340/618; 340/603
(58) Field of Classification Search ............ 340/626, 340/618, 614, 605, 603, 610; 137/551, 557; 702/45, 47, 183
See application file for complete search history.

(56) References Cited

U.S. PATENT DOCUMENTS

| 4,928,255 | A  | * | 5/1990  | Brennecke et al. ......... 700/301 |
| 6,441,744 | B1 | * | 8/2002  | Adams et al. ............... 340/626 |
| 6,959,607 | B2 |   | 11/2005 | Wilda |
| 2004/0249583 | A1 |   | 12/2004 | Eryurek et al. |
| 2005/0097963 | A1 |   | 5/2005 | Wilda |
| 2006/0206288 | A1 |   | 9/2006 | Brahmajosyula et al. |

* cited by examiner

*Primary Examiner*—Anh V La
(74) *Attorney, Agent, or Firm*—Schwegman, Lundberg & Woessner, P.A.

(57) ABSTRACT

A signal representative of a pressure is received from an industrial transmitter. An isolation indicator signal may be obtained by control signals from an isolation valve assembly or by signals from a DCS to indicate that isolation has occurred.

19 Claims, 1 Drawing Sheet

ADVANCED TRANSMITTER ISOLATION FEATURE

BACKGROUND

Isolating a transmitter in an industrial process control system is a feature used to isolate or remove industrial transmission equipment from the process for purposes of calibration, repair and routine maintenance. Such a feature maintains even greater importance where a transmitter is used to monitor high temperature and pressure service or volatile chemicals. A technician wishing to perform maintenance, may assume isolation has occurred and may begin to drain or open the transmitter. However, due to a leak or other fault with the isolation valve, the conditions may not be safe to perform needed maintenance (e.g. pressure or temperature high enough to ignite a process fluid when exposed to air), and thus causing an accident resulting in a fire or severe personal injury.

The industrial transmitters themselves may maintain processing capability locally or alternatively, or in combination, may rely upon a central microprocessing system such as a Distributed Control System (DCS). Such processing may allow the transmitter to analyze sensed parameters such as temperature and pressure to make a determination as to the condition of a monitored process fluid. Without the ability to have more than one indication from which to determine the transmitter's isolation, false indication can lead to damage and personal injury. There is a need to improve the reliability of transmitter isolation indications to reduce maintenance costs and injury. Finally, there also exists the need to provide local and remote indication as to isolation when availability of information is minimal.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
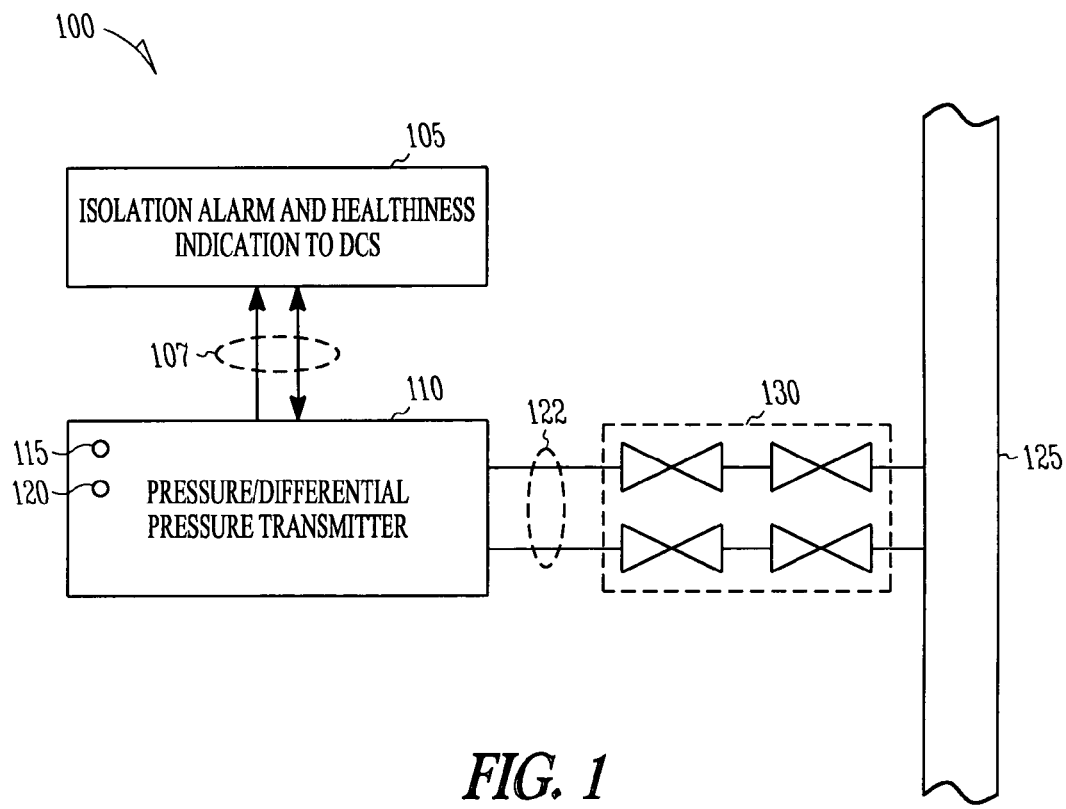
FIG. 1 is a block diagram of a system having a transmitter with advanced isolation indication according to an example embodiment.

An advanced transmitter isolation system 100 of FIG. 1 includes a distributed control system (DCS) 105 which provides central microprocessing capability to monitor and control communication with industrial transmitter 110. Communication between DCS 105 and industrial transmitter 110 occur via communication lines 107. The industrial transmitter 110, receives a signal representative of the pressure of a fluid residing within a pipeline 125 via sense lines 122. Pipeline 125 may be any fluid containing vessel, such as a tank or other device, which is intended to be included with use of the term "pipeline". Isolation valve assembly 130 provides the capability to shut off the pressure between the industrial transmitter 110 and the pipeline 125.

The industrial transmitter 110 has a sensor and an electronic body inside, which converts a sensed input signal from the sense lines 122 into an output representative of the pressure in the pipeline 125. According to one embodiment, the pressure may include a differential pressure, an absolute pressure or a gauge pressure. Alternatively, it is within the scope of this invention that other parameters may be measured instead of or in combination with pressure. Examples include flow, level, temperature and material property. The fluid residing within the pipeline 125 may include various liquids and/or gases under various pressures, some of which may exceed 100PSI or higher. The industrial transmitter 110 can be calibrated and configured for the measurement of the fluid physical properties by communication with the DCS 105.

In the event that maintenance on the industrial transmitter 110 is required, it may be necessary to isolate the industrial transmitter 110 from the pressures associated with the pipeline 125. This capability may be performed by the isolation valve assembly 130. A maintenance technician may assume that the industrial transmitter 110 is isolated due to activation of the isolation valve assembly 130 and may begin draining or opening the industrial transmitter 110. However, the industrial transmitter 110 may actually not have complete isolation from pipeline 125 due to a fault condition in the isolation valve assembly 130, such as a valve leak. This could result in an accident in the form of uncontrolled spraying of the fluid which could result in a fire or personal injury. In order to ensure the safe removal of the industrial transmitter 110 from the pressurized fluid of the pipeline 125, according to one embodiment, the closure of the isolation valve assembly 130 should be complete. Additionally there may be a confirmation of such completion, which should be as accurate as possible.

According to one embodiment, an indication that the industrial transmitter 110 is isolated from the pipeline 125 is provided. Such an indication may exist locally on the industrial transmitter 110, such as isolation indicator 115 or at the DCS 105 in the form of an alarm. In one embodiment, this indication is provided at both locations. According to one embodiment, an algorithm located at the industrial transmitter 110 may be utilized to determine the isolation indication. Location of the algorithm at the industrial transmitter 110 may be used for critical services, such as high temperature or pressure applications. An example could be that pressure differential between both sides of the valve assembly 130 is obtained such that the representative signal of a fluid pressure within pipeline 125 falls below a predetermined threshold, therefore isolation is believed to have occurred.

There could arise a situation in which the isolation indication is not sufficient to accurately indicate the isolation due to lack of data. In one embodiment, a second indication of the reliability of the isolation indication, known as a healthiness indicator 120, may be used to provide further information to validate the isolation indicator 115. There may be a variety of data points used to determine the healthiness of the isolation of the industrial transmitter 110. In fact, there could arise a situation in which sufficient data is not available, such as too few data points or no prior history. The healthiness indicator 120 could provide an accurate picture of the situation, whether complete information is available or not.

According to one embodiment, the healthiness indicator may include an algorithm that accepts further indications about the status of the isolation valve assembly 130 such as a time period during which the isolation valve assembly 130 receives a closure signal from the DCS 105 until a completion signal is transmitted to the DCS 105 from the isolation valve assembly 130. Such an algorithm may occur locally at the industrial transmitter 110. In another embodiment, the healthiness indication may include an algorithm to determine a pressure difference between a first indication and a second indication of the pressure by the industrial transmitter 110 occurring over a period of time. In a further embodiment, a third indication may be provided by a separate device which monitors a different physical property of the fluid between the isolation valve assembly 130 and the industrial transmitter 110. In one embodiment, the pressure may fluctuate while monitoring the process. The absence of such fluctuations in combination with knowledge that the process is operating may provide an indication that the transmitter is likely properly isolated. In yet another embodiment, the industrial transmitter may include memory from which to derive historical data to be compared to present data as a means to determine the healthiness of the valve isolation indicator 115. In such an example, past data of information such as elapsed time to complete isolation valve assembly 130 closure can be compare to present or future data as a means to determine healthiness. The healthiness signal may include transmission of a voltage level, a current level, a time duration and a pressure differential.

Figure 2:
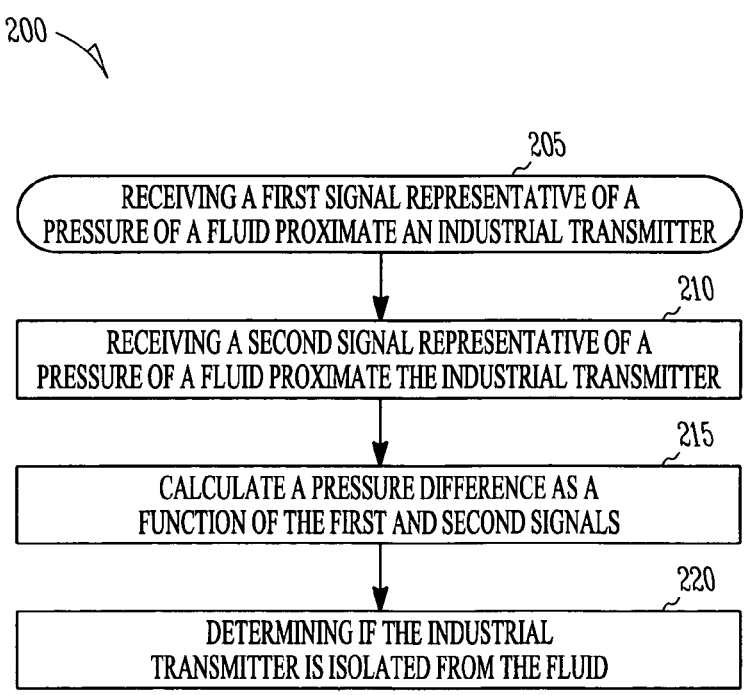
FIG. 2 is a flow chart showing a method of determining advanced transmitter isolation according to an example embodiment.

FIG. 2 illustrates a method implemented by a system 200 to determine the healthiness of an isolation indication. At 205, a microprocessor receives a first signal representative of a pressure of a fluid proximate an industrial transmitter, such as industrial transmitter 110. The microprocessor may reside locally at the transmitter. The term "microprocessor" is meant to be interpreted broadly as any type of circuitry or combination of circuitry, firmware and software, which is capable of performing the methods herein. At 210, a microprocessor receives a second signal representative of a pressure of a fluid proximate the industrial transmitter. The second signal may include an elapsed time, a second pressure value or some other physical property of the fluid proximate the industrial transmitter. At 215, an algorithm is used to calculate a pressure difference as a function of the first and second signals. Alternatively, or in combination, other indications may be included in this algorithm. At 220, the microprocessor will make a determination as to the healthiness of the isolation indicator and may further transmit an alarm, or other signal, to indicate advanced isolation of the transmitter.

One example of determining advanced isolation could include a transmitter, such as industrial transmitter 110, receiving a first signal representative of a first pressure on one side of a valve, such as valve assembly 130. The transmitter, also receiving a second signal representative of a second pressure on the opposing side of the valve such that a pressure differential may be determined by the transmitter. Additionally, the transmitter may store the first and second signals for use in determining the healthiness of the isolation indication.

According to one example, the healthiness indication may include a comparison of a present signal, representative of the first and second pressure differential, with a stored signal such as a past signal representative of the first and second pressure differential. If the stored signal is significantly different than the present signal, a healthiness indication may indicate a potentially hazardous situation. The healthiness indication may include a plurality of levels such that a present signal representative of a pressure differential similar to that of a stored signal may indicate a level one indication for low hazard. Alternatively, a significant difference between the present and stored signals may indicate a level three indication for high hazard.

The Abstract is provided to comply with 37 C.F.R. § 1.72 (b) to allow the reader to quickly ascertain the nature and gist of the technical disclosure. The Abstract is submitted with the understanding that it will not be used to interpret or limit the scope or meaning of the claims.

The invention claimed is:

1. A system comprising:
    a first module configured to receive a first signal representative of a pressure of a fluid on a pipeline side of a valve positioned adjacent to a pipeline;
    a second module configured to receive a second signal representative of a pressure of the fluid on a non-pipeline side of the valve;
    a third module to determine a difference between the first signal and the second signal; and
    a fourth module to determine an isolation of an industrial transmitter positioned on the non-pipeline side of the valve as a function of the difference between the first pressure and the second pressure.

2. The system of claim 1, wherein the industrial transmitter is adapted to sense one or more parameters of the group comprising temperature and pressure.

3. The system of claim 2, wherein the pressure comprises one or more of absolute, gauge, and differential.

4. The system of claim 2, wherein the module is further configured to store the one or more parameters in a memory.

5. The system of claim 1, wherein the first signal is representative of a healthiness value associated with a separate device.

6. The system of claim 5, wherein the healthiness value comprises one or more of voltage level, current level, time duration and pressure differential.

7. The system of claim 1, wherein the module is further configured to trigger an alarm as a function of the isolation.

8. The system of claim 7, wherein the module is configured to communicate the alarm to a microprocessor system.

9. A method of diagnosing an industrial transmitter coupled to a process fluid, the method comprising:
    receiving at a processor a first signal representative of a first pressure of a fluid on a pipeline side of a valve positioned adjacent to a pipeline;
    receiving at the processor a second signal representative of a second pressure of a fluid on a non-pipeline side of the valve;
    using the processor to calculate a pressure difference as a function of the first and second signals; and
    determining an isolation of an industrial transmitter positioned on the non-pipeline side of the valve as a function of the difference between the first pressure and the second pressure.

10. The method of claim 9, further includes receiving a third signal representative of a valve closure event.

11. The method of claim 10, wherein the third signal includes a time duration as a function of the valve closure.

12. The method of claim 9, wherein the first signal representative of a first pressure comprises one or more of absolute, gauge, and differential.

13. The method of claim 9, wherein the calculating a pressure difference includes one or more of the first signal representative of a first pressure, the second signal representative of a second pressure, and an elapsed time.

14. The method of claim 9, wherein the calculating occurs at the industrial transmitter.

15. The method of claim 9, wherein the calculating occurs remotely at a central microprocessing system.

16. The method of claim 9, wherein the determining if the industrial transmitter is isolated from the fluid includes reaching a healthiness value associated with a separate device.

17. The method of claim 16, further comprising triggering an alarm as a function of the determining if the industrial transmitter is isolated from the fluid.

18. The method of claim 17, further comprising communicating the alarm to a microprocessor system.

19. The method of claim 9, wherein the receiving a first signal includes storing one or more parameters of the group comprising temperature and pressure in a memory.

* * * * *